US008817355B2

(12) United States Patent
Das et al.

(10) Patent No.: US 8,817,355 B2
(45) Date of Patent: Aug. 26, 2014

(54) ELECTROCHROMIC DEVICE (75) Inventors: Rupasree Ragini Das, Suwon-si (KR); Seog Jin Jeon, Yongin-si (KR); Chang Ho Noh, Suwon-si (KR); Jae Eun Jang, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 296 days.

(21) Appl. No.: 13/113,291

(22) Filed: May 23, 2011

(65) Prior Publication Data
US 2012/0176658 A1 Jul. 12, 2012

(30) Foreign Application Priority Data

Jan. 7, 2011 (KR) .................. 10-2011-0001934

(51) Int. Cl.
*G02F 1/15* (2006.01)
(52) U.S. Cl.
USPC .......................................... 359/265
(58) Field of Classification Search
USPC ......... 359/265, 273, 274
See application file for complete search history.

(56) References Cited

U.S. PATENT DOCUMENTS

| 5,870,275 A | 2/1999 | Shiono et al. |
| 6,828,062 B2 * | 12/2004 | Lu et al. ................ 429/213 |
| 2001/0008458 A1 * | 7/2001 | Asano et al. ............ 359/267 |
| 2005/0179012 A1 | 8/2005 | Kwon et al. |
| 2006/0110638 A1 | 5/2006 | Corr et al. |
| 2008/0128287 A1 * | 6/2008 | Wu et al. ................ 205/109 |
| 2008/0131771 A1 * | 6/2008 | Wu et al. ................ 429/188 |

FOREIGN PATENT DOCUMENTS

| JP | 08321440 | 12/1996 |
| JP | 2000156329 A | 6/2000 |
| JP | 2003229333 A | 8/2003 |
| JP | 2004151265 A | 5/2004 |
| JP | 2005099249 A | 4/2005 |
| WO | WO-2004067673 A1 | 8/2004 |

* cited by examiner

*Primary Examiner* — Joseph P Martinez
(74) *Attorney, Agent, or Firm* — Harness, Dickey & Pierce, P.L.C.

(57) ABSTRACT

An electrochromic device according to example embodiments may include a first electrode and a second electrode facing each other, an electrochromic layer positioned between the first electrode and second electrode and including an electrochromic material, and an electrolyte contacting the electrochromic layer between the first electrode and second electrode and including an electron accepting molecule.

12 Claims, 7 Drawing Sheets

ELECTROCHROMIC DEVICE

CROSS-REFERENCE TO RELATED APPLICATION

This application claims priority under 35 U.S.C. §119 to Korean Patent Application No. 10-2011-0001934, filed in the Korean Intellectual Property Office on Jan. 7, 2011, the entire contents of which are incorporated herein by reference.

BACKGROUND

1. Field

Example embodiments relate to an electrochromic device.

2. Description of the Related Art

Electrochromism refers to a phenomenon in which a color reversibly changes in accordance with the direction of an electric field when a voltage is applied. A material having such a property, that is, a material whose optical characteristic may reversibly change through an electrochemical redox reaction, is called an electrochromic material. An electrochromic material may not display a color until an electric field is applied thereto. Conversely, an electrochromic material may display a color when no electric field is applied, and when an electric field is applied, the color may no longer be displayed.

An electrochromic material has been applied to an electrochromic device that changes light transmission characteristics depending on a voltage. An electrochromic device has been applied to a device using light transmission characteristics such as smart windows. An electrochromic device has also been applied to a display device such as electronic paper due to its portability and light weight nature.

SUMMARY

Example embodiments of the present invention relate to an electrochromic device having improved response speed and color stability.

According to a non-limiting embodiment of the present invention, an electrochromic device may include a first electrode and a second electrode facing each other, an electrochromic layer positioned between the first electrode and second electrode and including an electrochromic material, and an electrolyte contacting the electrochromic layer between the first electrode and second electrode and including an electron accepting molecule.

The electron accepting molecule may include a heteroaromatic compound.

The electron accepting molecule may include imidazole, triazole, pyridine, pyrimidine, quinoline, quinoxaline, anthrazoline, a derivative thereof, or a combination thereof.

The electron accepting molecule may include at least one selected from the compounds listed in the following Group 1.

[Group 1]

In Group 1, $R_1$ to $R_{12}$ may each be independently selected from hydrogen, a substituted or unsubstituted C1 to C30 alkyl group, a substituted or unsubstituted C3 to C30 cycloalkyl group, a substituted or unsubstituted C3 to C30 heterocycloalkyl group, a substituted or unsubstituted C6 to C30 aryl group, a substituted or unsubstituted C3 to C30 heteroaryl group, a substituted or unsubstituted C2 to C30 alkenyl group, a substituted or unsubstituted C3 to C30 cycloalkenyl group, a substituted or unsubstituted C3 to C30 heterocycloalkenyl group, a substituted or unsubstituted C1 to C30 alkoxy group, a halogen, a halogen-containing group, a cyano group, and a combination thereof.

The electron accepting molecule may include imidazole derivatives listed in the following Group 2.

[Group 2]

In Group 2, $R_{13}$ to $R_{22}$ may each be independently selected from hydrogen, a substituted or unsubstituted C1 to C30 alkyl group, a substituted or unsubstituted C3 to C30 cycloalkyl group, a substituted or unsubstituted C3 to C30 heterocycloalkyl group, a substituted or unsubstituted C6 to C30 aryl group, a substituted or unsubstituted C3 to C30 heteroaryl group, a substituted or unsubstituted C2 to C30 alkenyl group, a substituted or unsubstituted C3 to C30 cycloalkenyl group, a substituted or unsubstituted C3 to C30 heterocycloalkenyl group, a substituted or unsubstituted C1 to C30 alkoxy group, a halogen, a halogen-containing group, a cyano group, and a combination thereof.

The electron accepting molecule may act as a counter material of the electrochromic material in a redox reaction.

The electron accepting molecule may be a neutral compound.

The electron accepting molecule may be included at about 0.001M to 0.1M based on the total amount of the electrolyte.

The electrolyte may further include an ionic liquid electrolyte, an ionic solid polymer electrolyte, or a combination thereof.

The electrolyte may further include ferrocene or a derivative thereof.

The electrochromatic material may include a metal oxide, a viologen compound, a phthalate-based compound, a pyridine-based compound; an anthraquinone-based compound; an aminoquinone-based compound; rare earth element-based organic compound; a phthalocyanine-based compound; a ruthenium-based organometallic compound; a Leuco-based dye compound; a phenothiazine-based compound, and the like.

The electrochromic device may display substantially similar color at about 1.5V and about 2.0V.

DETAILED DESCRIPTION

Example embodiments will be described in further detail with reference to the accompanying drawings. However, it should be understood that the disclosure may be embodied in many different forms and should not be construed as limited to the example embodiments set forth herein.

In the drawings, the thickness of the layers, films, panels, regions, etc., may have been exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, the terms "a" and "an" are open terms that may be used in conjunction with singular items or with plural items.

Figure 1:
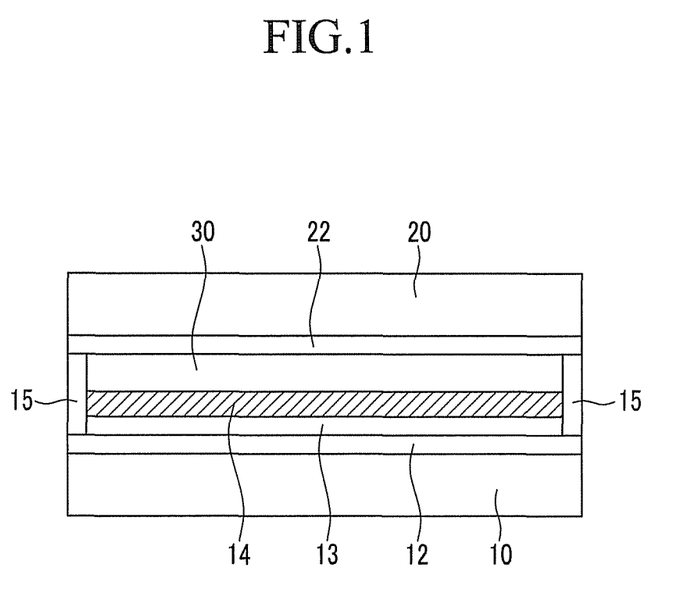
FIG. 1 is a cross-sectional view of an electrochromic device according to example embodiments.

Hereinafter, the electrochromic device according to example embodiments is described with reference to FIG. 1. FIG. 1 is a cross-sectional view of an electrochromic device according to example embodiments.

Referring to FIG. 1, the electrochromic device according to example embodiments may include a lower substrate 10 and an upper substrate 20 opposing each other and fixed by a spacer 15; a lower electrode 12 and an upper electrode 22 positioned respectively on one side of the lower substrate 10 and the upper substrate 20; an electrochromic layer 14 positioned between the lower electrode 12 and the upper electrode 22; and an electrolyte 30 contacting the electrochromic layer 14 between the lower electrode 12 and the upper electrode 22.

The lower substrate 10 and upper substrate 20 may be formed of transparent glass or plastic. Examples of the plastic include one or more materials selected from polyacrylate, polyethylene ether phthalate, polyethylene naphthalate, polycarbonate, polyarylate, polyetherimide, polyethersulfone, and polyimide.

At least one of the lower electrode 12 and upper electrode 22 may be formed of a transparent conductor. For example, the transparent conductor may be inorganic conductive materials including indium tin oxide (ITO), fluorine-doped tin oxide (FTO), or antimony doped tin oxide (ATO). Alternatively, the transparent conductor may be organic conductive materials such as polyacetylene or polythiophene.

The electrochromic layer 14 includes an electrochromic material. The electrochromic material is a compound capable of reversible color display by electrochemical change according to an electric field direction when voltage is applied. A unique color may be displayed according to the material.

The electrochromic material may be a cathodic coloration material or an anodic coloration material. The cathodic coloration material displays a color in a reduction state and becomes transparent in an oxidation state. On the other hand, the anodic coloration material displays a color in an oxidation state and becomes transparent in a reduction state.

The electrochromic material may include, for example, a metal oxide such as tungsten oxide ($WO_3$), molybdenum oxide ($MoO_3$), titanium oxide ($TiO_2$), etc.; a p-type metal oxide such as vanadium oxide ($V_2O_5$), iridium oxide ($IrO_2$), niobium oxide ($Nb_2O_5$), nickel oxide (NiO), and the like; a viologen compound such as a viologen derivative; a phthalate-based compound such as isophthalate; a pyridine-based compound; an anthraquinone-based compound; an aminoquinone-based compound; a rare earth element-based organic compound; a phthalocyanine-based compound; a ruthenium-based organometallic compound; a leuco-based dye compound; a phenothiazine-based compound; a polymer compound; and the like.

The electrochromic material may be adsorbed on nanoparticles, for example titanium oxide ($TiO_2$). A semiconductor material may be used as the nano-particles and may include, for example, titanium oxide ($TiO_2$), zinc oxide ($ZnO_2$), tungsten oxide ($WO_3$), or a combination thereof. The nano-particles may be of various shapes including a sphere, tetrahedron, cylinder, triangle, disk, tripod, tetrapod, cube, box, star, tube, etc. The size of the nano-particles may be about 1 to 100 nm.

An auxiliary layer 13 may be disposed between the lower electrode 12 and the electrochromic layer 14 to improve the adherence between the lower electrode 12 and the electrochromic layer 14. The auxiliary layer 13, however, may be omitted.

The electrolyte 30 fills the space between the lower electrode 12 and the upper electrode 22. The electrolyte 30 also contacts the electrochromic layer 14.

The electrolyte 30 provides a material that promotes an oxidation/reduction reaction of the electrochromic material of the electrochromic layer 14. The electrolyte 30 may be a liquid electrolyte or a solid polymer electrolyte. The liquid electrolyte or solid polymer electrolyte may include an ionic material. An ionic liquid electrolyte may include, for example a solution wherein a lithium salt such as LiOH or $LiClO_4$, a potassium salt such as KOH, or a sodium salt such as NaOH, etc., is dissolved in a solvent, but is not limited thereto. The ionic solid electrolyte may include, for example poly(2-acrylamino-2-methylpropane sulfonic acid) or poly(ethylene oxide), but is not limited thereto.

The electrolyte 30 may include an electron accepting molecule as an additive. The electron accepting molecule may be a neutral compound, not an ionic material.

The electron accepting molecule may include a heteroaromatic compound, for example imidazole, triazole, pyridine, pyrimidine, quinoline, quinoxaline, anthrazoline, a derivative thereof, or a combination thereof.

The electron accepting molecule may include at least one compound selected from the following Group 1.

[Group 1]

In Group 1, $R_1$ to $R_{12}$ may each be independently selected from hydrogen, a substituted or unsubstituted C1 to C30 alkyl group, a substituted or unsubstituted C3 to C30 cycloalkyl group, a substituted or unsubstituted C3 to C30 heterocycloalkyl group, a substituted or unsubstituted C6 to C30 aryl group, a substituted or unsubstituted C3 to C30 heteroaryl group, a substituted or unsubstituted C2 to C30 alkenyl group, a substituted or unsubstituted C3 to C30 cycloalkenyl group, a substituted or unsubstituted C3 to C30 heterocycloalkenyl group, a substituted or unsubstituted C1 to C30 alkoxy group, a halogen, a halogen-containing group, a cyano group, and a combination thereof.

The electron accepting molecule may include the imidazole derivatives listed in the following Group 2.

[Group 2]

In Group 2, $R_{13}$ to $R_{22}$ may each be independently selected from hydrogen, a substituted or unsubstituted C1 to C30 alkyl group, a substituted or unsubstituted C3 to C30 cycloalkyl group, a substituted or unsubstituted C3 to C30 heterocycloalkyl group, a substituted or unsubstituted C6 to C30 aryl group, a substituted or unsubstituted C3 to C30 heteroaryl group, a substituted or unsubstituted C2 to C30 alkenyl group, a substituted or unsubstituted C3 to C30 cycloalkenyl group, a substituted or unsubstituted C3 to C30 heterocycloalkenyl group, a substituted or unsubstituted C1 to C30 alkoxy group, a halogen, a halogen-containing group, a cyano group, and a combination thereof.

The electron accepting molecule may act as a counter material of the electrochromic material in a redox reaction.

Since the electron accepting molecule does not change the unique color of the electrochromic material, the color characteristic may be stabilized. Also, there is a memory effect in which a uniform color may be maintained at a predetermined voltage range.

As examples of the electrolyte 30, reactions containing $LiClO_4$ as an ionic liquid, containing polyethylene glycol as a solvent, and containing imidazole as an electron accepting molecule are described.

The following Reaction Schemes 1 and 2 show an example where a neutral compound imidazole acts as an electron acceptor.

[Reaction Scheme 1]

(1)

[Reaction Scheme 2]

(2)

The electron accepting molecule may increase the electron mobility by facilitating electron hopping in an electrolyte.

As shown in the following Reaction Schemes 3 and 4, the electron accepting molecule may result in color through a reversible oxidation and reduction reaction with an electrochromic material, for example a viologen derivative.

[Reaction Scheme 3]

[Reaction Scheme 4]

The electrolyte 30 may contain the ionic liquid electrolyte or ionic solid polymer electrolyte as a major component and may contain the electron accepting molecule as an additive.

Herein, the electrolyte 30 may further contain ferrocene or a derivative thereof as an additive, instead of or in addition to the aforementioned electron accepting molecule.

The electrolyte 30 may be of a solution type in which the components are mixed in a solvent.

The electron accepting molecule may be present in an amount of about 0.001M to about 0.1M based on the total amount of the electrolyte 30. Within the above range, the electron transfer and electron collection characteristics are increased to improve the device characteristics.

The electrochromic device according to example embodiments has been described in connection with a transparent display element that does not include an additional reflector. However, it should be understood that the scope of this disclosure is not limited to such an embodiment. Rather, the technology of this disclosure may be applied to a case where there is a reflective layer on the lower substrate 10 or the upper substrate 20.

The following examples illustrate the present disclosure in further detail.

However, it is understood that this disclosure is not limited by these examples.

Fabrication of Electrochromic Device

Example 1

An indium tin oxide (ITO) electrode is formed on a polymer substrate to have a thickness of about 150 nm, and a $TiO_2$ layer having an average particle diameter of about 25 nm is formed thereon at a thickness of about 7 μm. Subsequently, a green electrochromic material represented by the following Chemical Formula A is deposited. A counter substrate is fabricated by stacking an ATO electrode on another polymer substrate at a thickness of about 500 nm, and then the two polymer substrates are hermetically sealed with a spacer therebetween.

Subsequently, a relatively fine hole is formed at the surface of the counter electrode by using a 0.75 mm-diameter drill, and then an electrochromic device is fabricated by injecting an electrolyte that is prepared by dissolving 0.05M of LiClO$_4$ and 0.01M of 4,5-dicyano imidazole in 200 g of polyethylene glycol into the space between the two polymer substrates through the fine pores.

Example 2

An electrochromic device is fabricated according to the same method as Example 1, except that the red electrochromic material represented by the following Chemical Formula B is used instead of the green electrochromic material represented by the above Chemical Formula A.

[Chemical Formula B]

Example 3

An electrochromic device is fabricated according to the same method as Example 1, except that the blue electrochromic material represented by the following Chemical Formula C is used instead of the green electrochromic material represented by the above Chemical Formula A.

[Chemical Formula C]

Example 4

An electrochromic device is fabricated according to the same method as Example 1, except that a solution prepared by dissolving 0.05M of LiClO$_4$ and 0.05M of 4,5-dicyanoimidazole in 200 g of polyethylene glycol is used as an electrolyte.

[Chemical Formula A]

Example 5

An electrochromic device is fabricated according to the same method as Example 1, except that a solution prepared by dissolving 0.05M of LiClO$_4$, 0.05M of 4,5-dicyanoimidazole, and 0.02M of ferrocene in 200 g of polyethylene glycol is used as an electrolyte.

Comparative Example 1

An electrochromic device is fabricated according to the same method as Example 1, except that a solution prepared by dissolving 0.05M of LiClO$_4$ and 0.02M of ferrocene in 200 g of polyethylene glycol is used as an electrolyte.

Comparative Example 2

An electrochromic device is fabricated according to the same method as Example 2, except that a solution prepared by dissolving 0.05M of LiClO$_4$ and 0.02M of ferrocene in 200 g of polyethylene glycol is used as an electrolyte.

Comparative Example 3

An electrochromic device is fabricated according to the same method as Example 3, except that a solution prepared by dissolving 0.05M of LiClO$_4$ and 0.02M of ferrocene in 200 g of polyethylene glycol is used as an electrolyte.

Evaluation-1

The response speeds of the electrochromic devices according to Examples 1 to 3 and Comparative Examples 1 to 3 are evaluated.

The response speeds are measured by applying a voltage of about 1.5V to the electrochromic devices according to Examples 1 to 3 and Comparative Examples 1 to 3 for about 6.5 seconds. The response speed of color change is measured by observing the extent of change of transmission as time passes.

Figure 2:
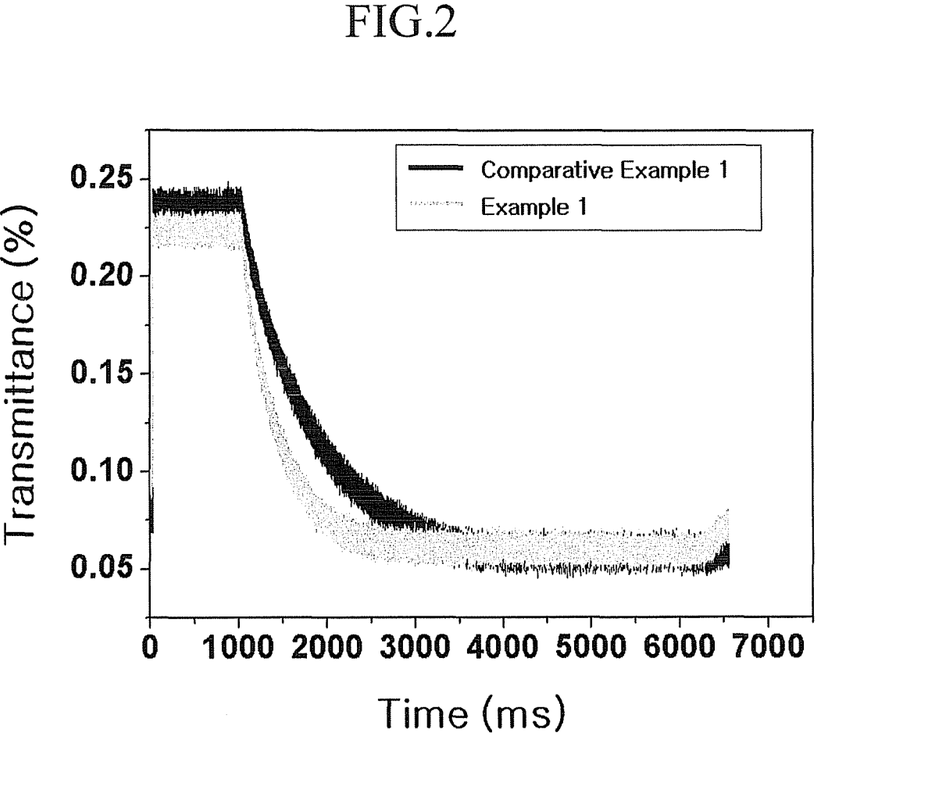
FIG. 2 is a graph showing time-based transmission variation of electrochromic devices according to Example 1 and Comparative Example 1.
Figure 3:
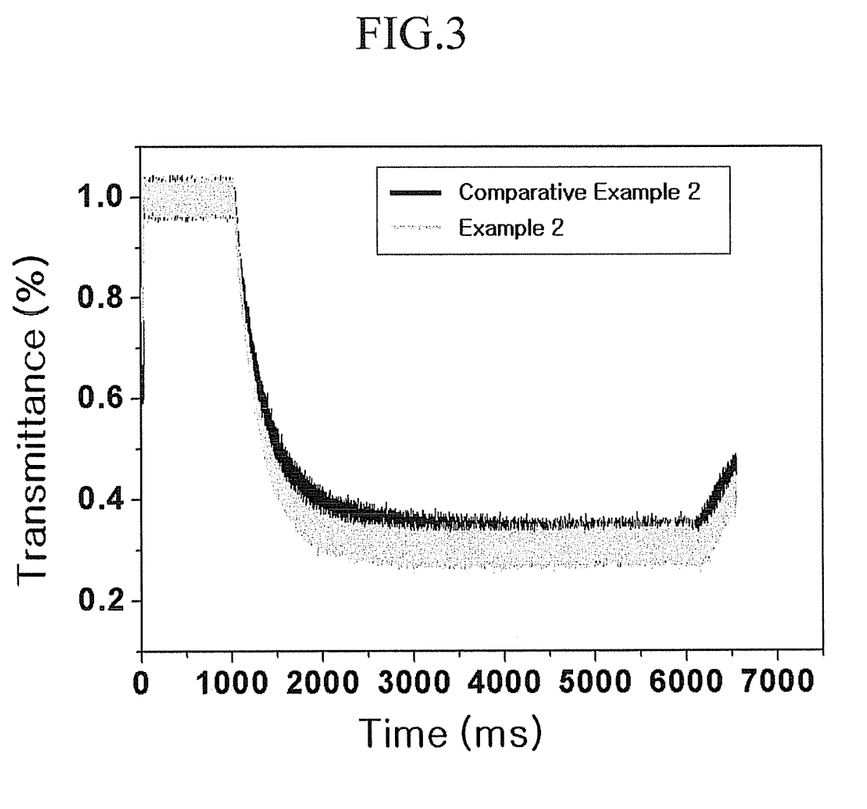
FIG. 3 is a graph showing time-based transmission variation of electrochromic devices according to Example 2 and Comparative Example 2.
Figure 4:
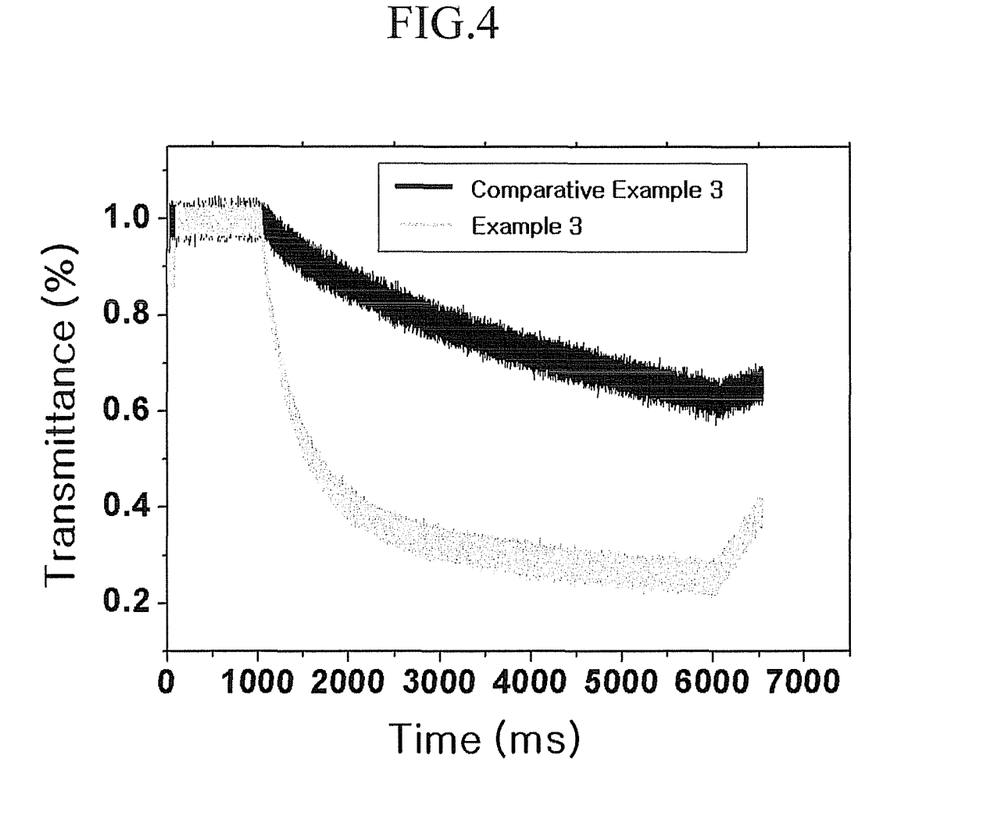
FIG. 4 is a graph showing time-based transmission variation of electrochromic devices according to Example 3 and Comparative Example 3.

The results are described hereafter with reference to FIGS. 2 to 4.

FIG. 2 is a graph showing time-based transmission variation of electrochromic devices according to Example 1 and Comparative Example 1, FIG. 3 is a graph showing time-based transmission variation of electrochromic devices according to Example 2 and Comparative Example 2, and FIG. 4 is a graph showing time-based transmission variation of electrochromic devices according to Example 3 and Comparative Example 3.

First, referring to FIG. 2, it may be seen that the transmission of the green electrochromic device according to Example 1 decreases faster than that of the green electrochromic device according to Comparative Example 1. Therefore, it may be seen from the result that the response speed of the green electrochromic device according to Example 1 is faster than that of the green electrochromic device according to Comparative Example 1.

Similarly, referring to FIG. 3, it may be seen that the transmission of the red electrochromic device according to Example 2 decreases faster than that of the red electrochromic device according to Comparative Example 2. Therefore, it may be seen from the result that the response speed of the red electrochromic device according to Example 2 is faster than that of the red electrochromic device according to Comparative Example 2.

Similarly, referring to FIG. 4, it may be seen that the transmission of the blue electrochromic device according to Example 3 decreases faster than that of the blue electrochromic device according to Comparative Example 3. Therefore, it may be seen from the result that the response speed of the blue electrochromic device according to Example 3 is faster than that of the blue electrochromic device according to Comparative Example 3.

Evaluation-2

The color stability and reversibility of the electrochromic devices according to Examples 4 and 5 and Comparative Example 1 are evaluated.

Color characteristics are observed by applying 1.5V and 2.0V to the electrochromic devices according to Examples 4 and 5 and Comparative Example 1.

Figure 5:
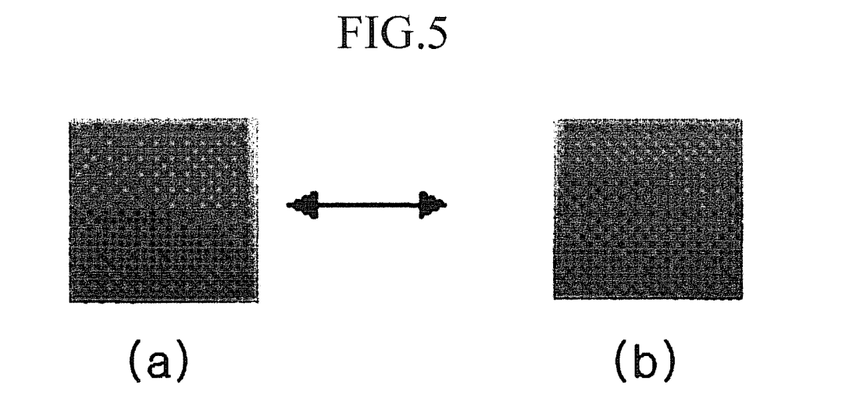
FIGS. 5(a)-(b) are photographs showing the colors displayed when 1.5V and 2.0V, respectively, are applied to an electrochromic device according to Example 4.
Figure 6:
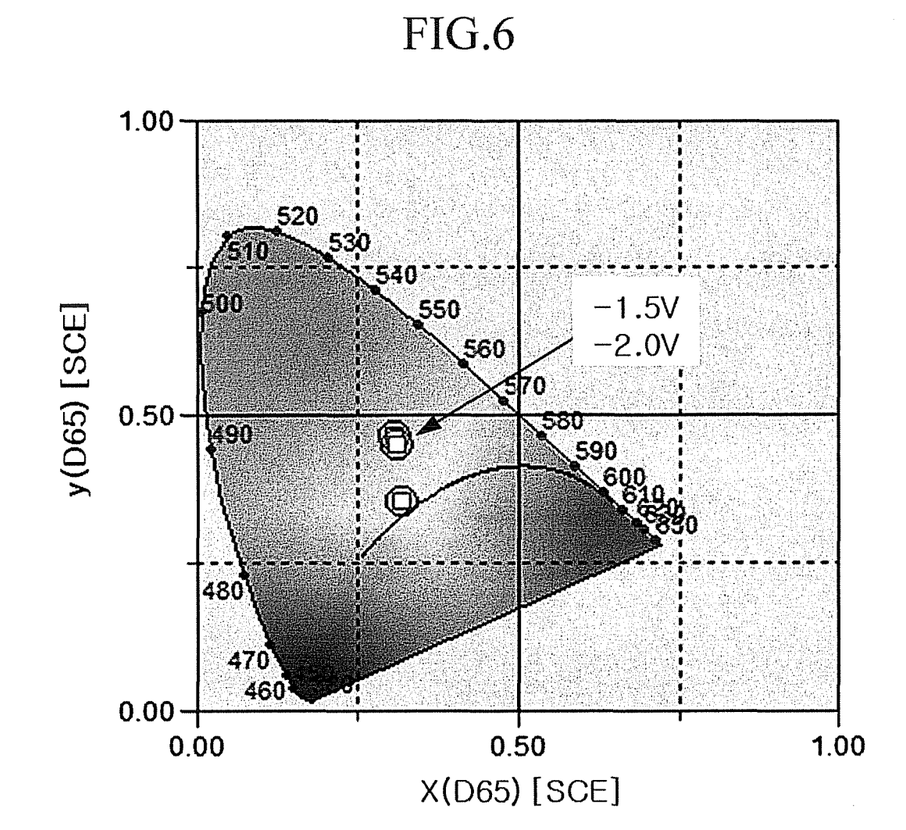
FIG. 6 is a color coordinate showing the colors displayed when 1.5V and 2.0V are applied to an electrochromic device according to Example 4.
Figure 7:
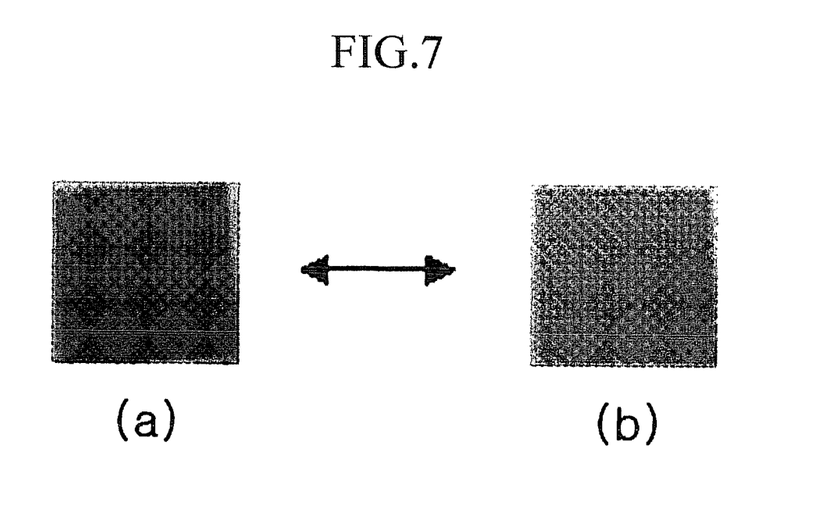
FIGS. 7(a)-(b) are photographs showing the colors displayed when 1.5V and 2.0V, respectively, are applied to an electrochromic device according to Example 5.

The results are described hereafter with reference to FIGS. 5 to 7.

FIGS. 5(a)-(b) are photographs showing the colors displayed when 1.5V and 2.0V, respectively, are applied to an electrochromic device according to Example 4, FIG. 6 is a color coordinate showing the colors displayed when 1.5V and 2.0V are applied to an electrochromic device according to Example 4, FIGS. 7(a)-(b) are photographs showing the colors displayed when 1.5V and 2.0V, respectively, are applied to an electrochromic device according to Example 5, and FIGS. 8(a)-(b) are photographs showing the colors displayed when 1.5V and 2.0V, respectively, are applied to an electrochromic device according to Comparative Example 1.

Referring to FIGS. 5 and 6, it may be seen that the electrochromic device according to Example 4 displays green of substantially the same color coordinates at about 1.5V (a) and 2.0V (b). This signifies that the electrochromic device according to Example 4 stably displays the color without any color change in the range of about 1.5V to 2.0V.

Referring to FIG. 7, the electrochromic device according to Example 5 displays a similar green at about 1.5V (a) and 2.0V (b). If any, the electrochromic device of Example 5 displays a somewhat yellowish green at about 2.0V when compared with the electrochromic device of Example 4. This signifies that the electrochromic device of Example 5 has somewhat degraded color stability.

Figure 8:
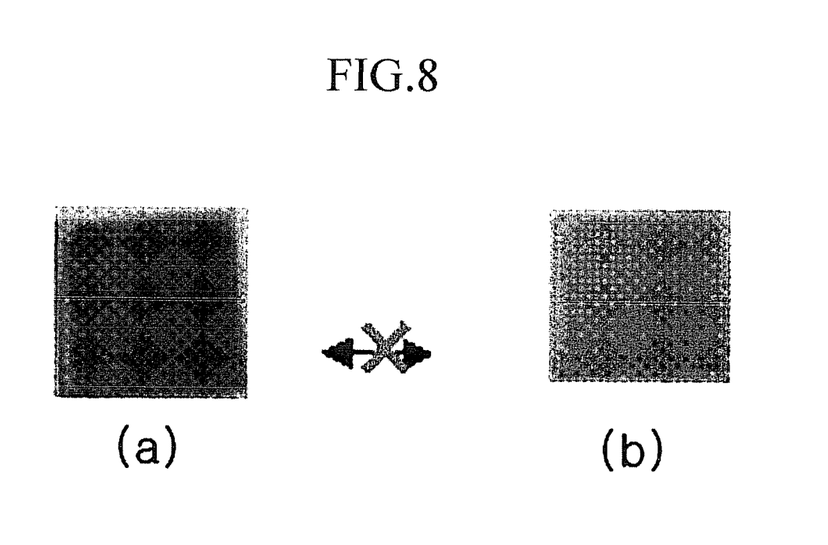
FIGS. 8(a)-(b) are photographs showing the colors displayed when 1.5V and 2.0V, respectively, are applied to an electrochromic device according to Comparative Example 1.

Referring to FIG. 8, the electrochromic device of Comparative Example 1 stably displays green at about 1.5V (a), but does not display green at about 2.0V (b). Also, it may be seen that the electrochromic device of Comparative Example 1 does not reversibly display color at about 1.5V and 2.0V.

Evaluation-3

The electrical stability of the electrochromic device according to Example 4 is evaluated.

The electrical stability of the electrochromic device according to Example 4 is measured after 3000 cycles through cyclic voltametry.

Figure 9:
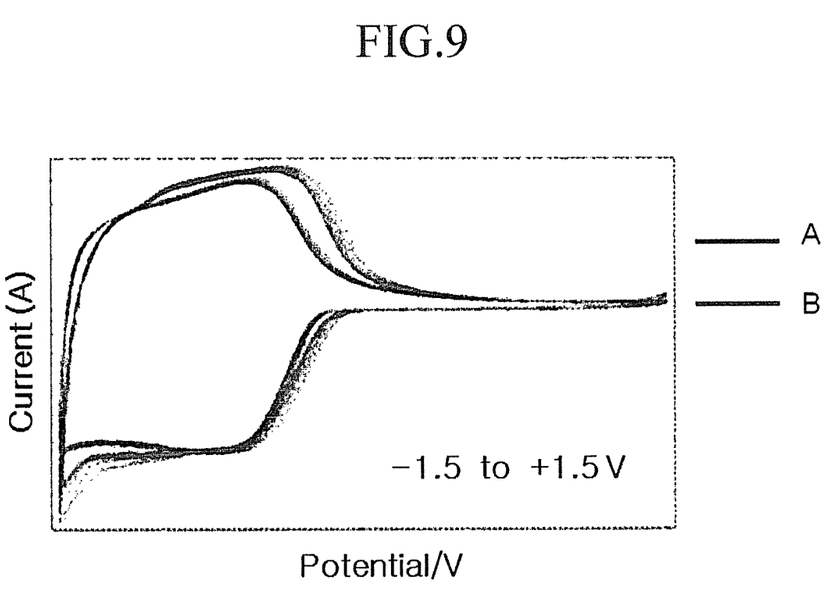
FIG. 9 is a graph showing a cyclic voltametry of the electrochromic device according to Example 4.

FIG. 9 is a graph showing cyclic voltametry of the electrochromic device according to Example 4.

Referring to FIG. 9, it may be seen that after the electrochromic device according to Example 4 goes through 3000 cycles in the voltage range of about −1.5V to +1.5V, the peak potential and current of the initial period (A) and after 3000 cycles (B) are almost the same. This result shows that the electrochromic device according to Example 4 has electrochemical stability according to the state of oxidation or reduction.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. An electrochromic device, comprising:
a first electrode and a second electrode;
an electrochromic layer between the first electrode and second electrode, the electrochromic layer including an electrochromic material adsorbed on nano-particles; and
an electrolyte between the first electrode and second electrode, the electrolyte including an electron accepting molecule and contacting the electrochromic layer, the electron accepting molecule being present at about 0.001M to 0.1M based on a total amount of the electrolyte.

2. The electrochromic device of claim 1, wherein the electron accepting molecule includes a heteroaromatic compound.

3. The electrochromic device of claim 1, wherein the electron accepting molecule includes imidazole, triazole, pyridine, pyrimidine, quinoline, quinoxaline, anthrazoline, a derivative thereof, or a combination thereof.

4. The electrochromic device of claim 1, wherein the electron accepting molecule includes a compound selected from Group 1:

[Group 1]

wherein $R_1$ to $R_{12}$ are each independently selected from hydrogen, a substituted or unsubstituted C1 to C30 alkyl group, a substituted or unsubstituted C3 to C30 cycloalkyl group, a substituted or unsubstituted C3 to C30 heterocycloalkyl group, a substituted or unsubstituted C6 to C30 aryl group, a substituted or unsubstituted C3 to C30 heteroaryl group, a substituted or unsubstituted C2 to C30 alkenyl group, a substituted or unsubstituted C3 to C30 cycloalkenyl group, a substituted or unsubstituted C3 to C30 heterocycloalkenyl group, a substituted or unsubstituted C1 to C30 alkoxy group, a halogen, a halogen-containing group, a cyano group, and a combination thereof.

5. The electrochromic device of claim 1, wherein the electron accepting molecule includes an imidazole derivative selected from Group 2:

[Group 2]

wherein $R_{13}$ to $R_{22}$ are each independently selected from hydrogen, a substituted or unsubstituted C1 to C30 alkyl group, a substituted or unsubstituted C3 to C30 cycloalkyl group, a substituted or unsubstituted C3 to C30 heterocycloalkyl group, a substituted or unsubstituted C6 to C30 aryl group, a substituted or unsubstituted C3 to C30 heteroaryl group, a substituted or unsubstituted C2 to C30 alkenyl group, a substituted or unsubstituted C3 to C30 cycloalkenyl group, a substituted or unsubstituted C3 to C30 heterocycloalkenyl group, a substituted or unsubstituted C1 to C30 alkoxy group, a halogen, a halogen-containing group, a cyano group, and a combination thereof.

6. The electrochromic device of claim 1, wherein the electron accepting molecule promotes a redox reaction involving the electrochromic material.

7. The electrochromic device of claim 1, wherein the electron accepting molecule is a neutral compound.

8. The electrochromic device of claim 1, wherein the electrolyte includes an ionic liquid electrolyte, an ionic solid polymer electrolyte, or a combination thereof.

9. The electrochromic device of claim 1, wherein the electrolyte includes ferrocene or a derivative thereof.

10. The electrochromic device of claim 1, wherein the electrochromic material includes a metal oxide, a viologen compound, a phthalate-based compound, a pyridine-based compound, an anthraquinone-based compound, an aminoquinone-based compound, a rare earth element-based organic compound, a phthalocyanine-based compound, a ruthenium-based organometallic compound, a leuco-based dye compound, a phenothiazine-based compound, or a combination thereof.

11. The electrochromic device of claim 1, wherein the nano-particles are formed of a semiconductor material.

12. The electrochromic device of claim 1, wherein the nano-particles have an average size ranging from 1 to 100 nm.

* * * * *